US011027283B2

(12) United States Patent
Meiling

(10) Patent No.: US 11,027,283 B2
(45) Date of Patent: Jun. 8, 2021

(54) MAGAZINE INSERT FOR A PNEUMATIC TUBE CONVEYOR CAPSULE FOR RECEIVING SAMPLE TUBES, AND PNEUMATIC TUBE CONVEYOR CAPSULE HAVING SUCH A MAGAZINE INSERT

(71) Applicant: Aerocom GmbH & Co. Communicationssyteme, Schwäbisch Gmünd (DE)

(72) Inventor: Johannes Meiling, Schwäbisch Gmünd (DE)

(73) Assignee: AEROCOM GMBH & CO. COMMUNICATIONSSYSTEME, Schwäbisch Gmünd (DE)

( * ) Notice: Subject to any disclaimer, the term of this patent is extended or adjusted under 35 U.S.C. 154(b) by 132 days.

(21) Appl. No.: 16/382,132

(22) Filed: Apr. 11, 2019

(65) Prior Publication Data
US 2019/0314822 A1    Oct. 17, 2019

(30) Foreign Application Priority Data
Apr. 13, 2018   (DE) ...................... 10 2018 205 639.0

(51) Int. Cl.
*B01L 9/06* (2006.01)
*G01N 35/04* (2006.01)
*G01N 1/00* (2006.01)

(52) U.S. Cl.
CPC ................ *B01L 9/06* (2013.01); *G01N 35/04* (2013.01); *B01L 2200/18* (2013.01); *B01L 2300/04* (2013.01); *B01L 2300/0832* (2013.01); *G01N 2001/002* (2013.01); *G01N 2001/005* (2013.01);
(Continued)

(58) Field of Classification Search
CPC ... G01N 2035/0403; G01N 2035/0405; G01N 2035/0439; G01N 2035/0441; G01N 2001/002; G01N 2001/005; B01L 9/06; B01L 2200/18
See application file for complete search history.

(56) References Cited

U.S. PATENT DOCUMENTS

2019/0291973 A1*  9/2019  Friedrich ............... G01N 35/04

FOREIGN PATENT DOCUMENTS

| DE | 10 2017 212 986 B3 | 8/2018 |
|---|---|---|
| DE | 10 2017 212 988 B3 | 8/2018 |
| EP | 0 589 528 A2 | 3/1994 |

(Continued)

*Primary Examiner* — Paul M. West
(74) *Attorney, Agent, or Firm* — Hackler Daghighian Martino & Novak

(57) ABSTRACT

A magazine insert for a pneumatic tube conveyor capsule for receiving sample tubes filled with bodily fluids includes a magazine drum, a fastening unit, a slider and a catch element. The magazine drum has a plurality of receiving chambers for the sample tubes. The fastening unit is pivotable about the longitudinal axis from a fastening position to a release position. The slider in the central recess of the magazine drum is slidable in axial direction from a first functional position bidirectionally to a respective second functional position relative to the magazine drum. The catch element is fastened to the slider and extends in radial direction into a control cam of the fastening unit. A pivoting of the fastening unit from the fastening position to its release position can be effected by transferring the slider to its corresponding second functional position.

15 Claims, 5 Drawing Sheets

(52) U.S. Cl.
CPC ............... *G01N 2035/0406* (2013.01); *G01N 2035/0441* (2013.01)

(56) References Cited

FOREIGN PATENT DOCUMENTS

| | | |
|---|---|---|
| EP | 3 441 330 A1 | 7/2018 |
| WO | 2014 081283 A1 | 5/2014 |
| WO | 2018 085871 A1 | 5/2018 |

* cited by examiner

MAGAZINE INSERT FOR A PNEUMATIC TUBE CONVEYOR CAPSULE FOR RECEIVING SAMPLE TUBES, AND PNEUMATIC TUBE CONVEYOR CAPSULE HAVING SUCH A MAGAZINE INSERT

CROSS-REFERENCE TO RELATED APPLICATIONS

This application claims priority to German Patent Application No. 10 2018 205 639.0, filed Apr. 13, 2018, the entire contents of which are hereby incorporated in full by this reference.

DESCRIPTION

Field of the Invention

The invention relates to a magazine insert for a pneumatic tube conveyor capsule for receiving sample tubes, and a pneumatic tube conveyor capsule having such a magazine insert. In medical practice, sample containers in the form of sample tubes are used for the extraction, transport, and also for the at least short-term storage of bodily fluids, such as blood, cerebrospinal fluid, pleural fluid, and the like.

BACKGROUND OF THE INVENTION

In practice, the sample tubes are frequently transported by means of a pneumatic tube conveyor system to a building-internal or also to an external destination, for example, a diagnostic laboratory. For that purpose, so-called pneumatic tube conveyor capsules, also called shipping cartridges, are used. As a rule, the pneumatic tube conveyor capsules have a tubular main part which is provided on both ends with a closable opening. Via these openings, the pneumatic tube conveyor capsule can be loaded with the respective material to be conveyed, and the material to be conveyed can subsequently be removed again, mostly automatically. The pneumatic tube conveyor capsules are usually closable on both ends by means of a swivel or hinged lid.

During normal operation of the pneumatic tube conveyor system, the pneumatic tube conveyor capsules and the sample tubes arranged therein are sometimes subject to enormous forces of up to 10 times the gravitational acceleration (10 g). During the transport of sensitive sample material, such as blood, this can thus result in unwanted changes of the sample material. In case of blood, for example, a hemolysis of the red blood cells and consequently a distortion of measurement results of diagnostic parameters can be triggered.

Therefore, the invention addresses the problem of providing a magazine insert for a pneumatic tube conveyor capsule, and a pneumatic tube conveyor capsule, in which the sample tubes are better protected during transport from being thrown around uncontrollably, and which allows for an overall simple and reliable handling, particularly an automated emptying of the magazine insert.

The problem relating to the magazine insert is solved by a magazine insert with the features described in claim 1. The pneumatic tube conveyor capsule according to the invention has the features described in claim 13. Preferred developments of the invention are the subject matter of the dependent claims.

The magazine insert according to the invention is provided for the installation in a pneumatic tube conveyor capsule and for the transport of sample tubes filled with bodily fluids along a pneumatic tube conveyor system. The magazine insert comprises a magazine drum, which is arrangeable (non-rotatably) in the pneumatic tube conveyor capsule and has a plurality of receiving chambers for the sample tubes. The receiving chambers are arranged annularly about the longitudinal axis of the magazine insert and each extends through the magazine drum in direction axial to the longitudinal axis of the magazine insert. The magazine insert has a fastening unit which is pivotable about the longitudinal axis of the magazine insert from a fastening position to a release position, wherein a sample tube arranged in the respective receiving chamber is held solely in a fixed position relative to the magazine drum, when the fastening unit is arranged in the fastening position.

A slider arranged in a central passage recess of the magazine drum is used, according to the invention, to actuate the fastening unit. The slider is slidable in axial direction from a first functional position bidirectionally to a respective second functional position relative to the magazine drum. A catch or catch element fastened to the slider is used for coupling the slider with the fastening unit. The catch element extends in radial direction into a control cam of the fastening unit, and so the fastening unit is pivotable from the fastening position to its release position by transferring the slider to its corresponding second functional position.

The magazine insert allows for a reliable securing of the sample tubes arranged in the magazine insert during their transport in a pneumatic tube conveyor capsule along a conducting tube of a pneumatic tube conveyor system. As a result, an unwanted throwing around of the sample tubes within the magazine insert can be prevented. Overall, impairments of the liquids and the like contained in the sample tubes can thus be counteracted. Unwanted analysis errors in case of diagnostic tests of liquids transported in the sample tubes can thus be counteracted. In addition, the magazine insert can be emptied on both sides in axial direction. The magazine insert can thus be unloaded (facilitated by gravity), regardless of its orientation.

According to the invention, the slider can be designed to be tubular or rod-shaped. In the first-mentioned case, the magazine insert can be realized with a particularly low material input and a smaller mass.

According to the invention, the fastening unit can comprise a bearing bushing having one fastening element for each receiving chamber, with said fastening element protruding from the bearing bushing in radial direction. The fastening elements, for example, can be riveted or screwed to the bearing bushing. As a result, individual fastening elements can be replaced if necessary. Alternatively, the fastening elements can also be adhered or welded to the bearing bushing. Particularly preferably, the fastening elements can be integral with the bearing bushing in the form of an injection-molded part, particularly made of plastic. This offers cost benefits particularly for the mass production of the magazine insert.

According to the invention, each individual fastening element is elastically deformable or elastically articulated on the bearing bushing. As a result, sample tubes with different diameters can be reliably secured in the receiving chambers. This is advantageous for the application range of the magazine insert.

According to a preferred embodiment of the invention, the bearing bushing of the fastening unit is provided with the control cam. As a result, a particularly large swivel angle of the fastening unit can be realized in a cost-efficient manner.

The control cam can be deigned particularly as a groove or an elongated hole. They can be realized in a cost-efficient manner and with only little technical effort. If the groove or the elongated hole is designed to be V-shaped, it is possible to realize a unidirectional swivel movement of the fastening unit, regardless of the axial direction of movement of the slider. As a result, the magazine insert can be realized with a structural design of little complexity.

According to the invention, a simplified and safe loading of the magazine insert with one or more sample tubes can be achieved in that the fastening unit has at least one closing means, by means of which the receiving chambers are at least partially closable on one end. This prevents too deep an insertion of the sample tubes in the receiving chambers and simultaneously ensures a reliable clamping of the sample tubes in the magazine insert. Preferably, the receiving chambers are closable in a synchronized manner by means of the closing means.

In terms of manufacturing, the closing means is preferably designed as a hole flange that extends away from the bearing bushing in radial direction. In terms of manufacturing, the hole flange can particularly be integral with the aforementioned bearing bushing. For example, the bearing bushing and the hole flange can be designed particularly as an injection-molded part, preferably made of plastic.

According to a preferred development of the invention, the magazine drum comprises a first and a second end plate which are connected to one another via a connection element, preferably in the form of a support tube. In such case, the receiving chambers are delimited at their circumference preferably by the two end plates and one respective tubular wall element arranged to be held between the two end plates. As a result, the magazine drum can be manufactured cost-efficiently with particularly little material input. The central tube can be designed to be grid-like in order to further decrease the material input.

The hole flange can be guided in axial direction on one of the two end plates of the magazine drum, particularly between two end plate sections of one of the two end plates. As a result, a particularly trouble-free operational application of the magazine insert can be realized.

According to the invention, each of the aforementioned wall elements can be transparent for the spectral range of the light visible for humans. As a result, the proper positioning of the sample tubes can be verified visually or also by means of suitable technical sensors in a simplified manner. In addition, unwanted leakages of the sample tubes to be transported in the magazine can be recognized or detected in a simplified manner, and appropriate protective measures can be taken for the further handling of a pneumatic tube conveyor capsule provided with the magazine insert.

The slider or the central tube can have at least one bearing part, preferably in the form of an annular collar, by means of which the slider is guided on the support tube as a form closure with sliding clearance. As a result, greater gauge differences of the support tube and the slider can be compensated, and the slider can be realized with a particularly low material input. In addition, it is also possible to thus counteract an unwanted jamming of the slider.

If the slider protrudes from one end of the magazine drum, the magazine insert in its operational application in a pneumatic tube conveyor capsule can be actuated in a simple manner in vertical direction with an actuation member of a pneumatic tube conveyor station, regardless of the orientation of the magazine insert.

According to the invention, the magazine drum or the entire magazine insert can consist of a plastic material. As a result, the magazine insert can be provided cost-efficiently and with relatively little mass.

The pneumatic tube conveyor capsule according to the invention has a tubular main part which is provided on both ends with an opening which is closable with a lid. In the main part, a previously described magazine insert is arranged, wherein the magazine drum is arranged to be held non-rotatably in the tubular main part. The magazine unit is advantageously arranged to be held detachably in the tubular main part. For example, the magazine drum can be screwed to the main part or also be held in a press fit in the main part. This simplifies a cleaning and a possible maintenance or repair of the pneumatic tube conveyor capsule. It is self-evident that the magazine insert can also be adhered or welded to the main part of the pneumatic tube conveyor capsule.

BRIEF DESCRIPTION OF THE DRAWINGS

In the following, the invention shall be described in more detail using an embodiment depicted in the drawing. For the description of the invention, the depicted embodiment shall only be of an exemplary nature.

The drawing shows in.

DETAILED DESCRIPTION OF THE PREFERRED EMBODIMENTS

Figure 1:
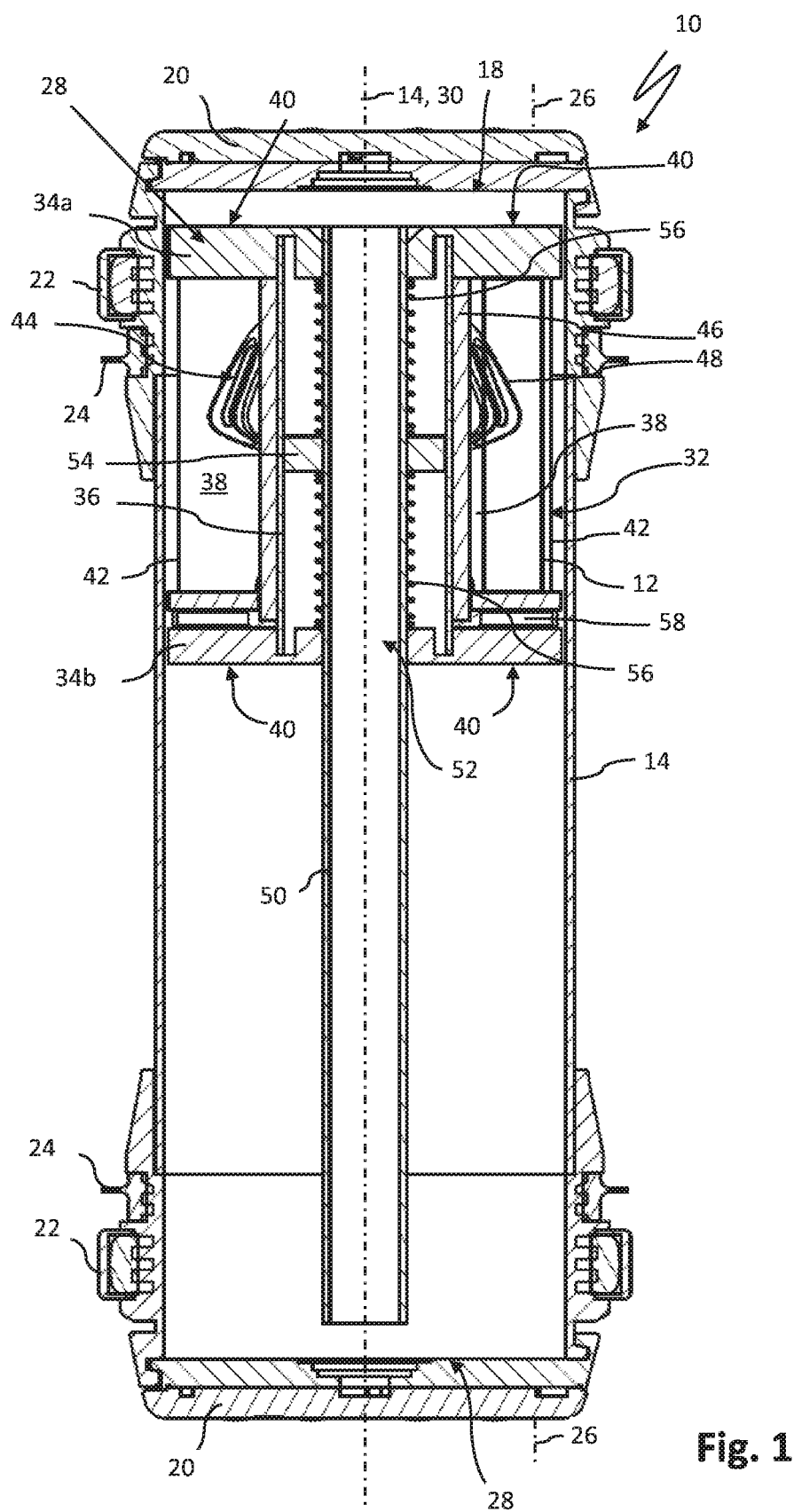
FIG. 1 is a cross-sectional view of a pneumatic tube conveyor capsule having a magazine insert for sample tubes.
Figure 2:
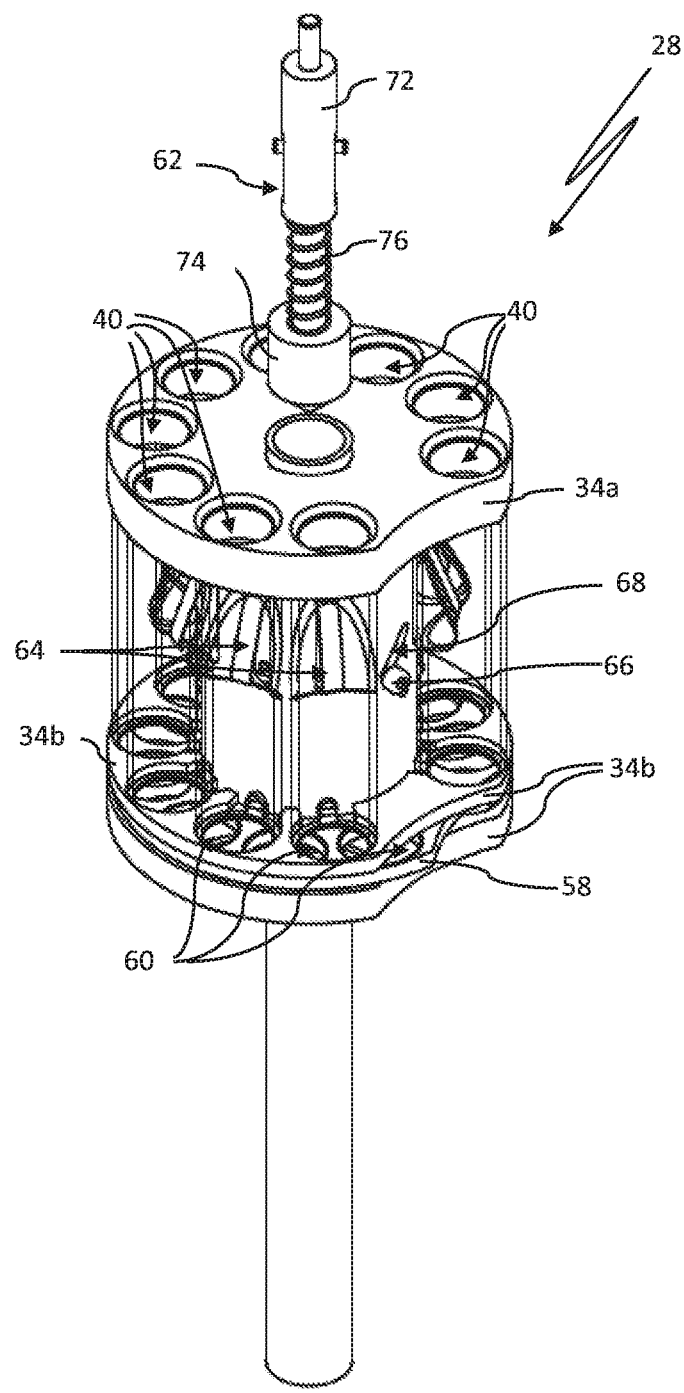
FIG. 2 is a detached perspective view of the magazine insert according to FIG. 1.

FIGS. 1 and 2 show a pneumatic tube conveyor capsule 10 provided for transporting sample tubes 12 within a pipeline system of an inherently known pneumatic tube conveyor system. In the sample tubes 12, bodily fluids, such as blood, cerebrospinal fluid, urine, pleural fluid, and the like can be stored. As a rule, the sample tubes 12 consist of a plastic material and are provided for a single use.

The pneumatic tube conveyor capsule 10 has a sleeve-like or tubular main part 14 which extends along the longitudinal axis 16 of the pneumatic tube conveyor capsule. The main part 14 is provided on both ends with an opening 18. The two openings 18 are used to load and unload the pneumatic tube conveyor capsule 10 and are each closable with a lid 20.

On the outer side of the pneumatic tube conveyor capsule 10, two running strips 22 are arranged in an inherently known manner which, for example, can consist of a textile or a fleece strap. If necessary, additional sealing rings 24 can be provided in order to allow for an improved sealing contact of the pneumatic tube conveyor capsule 10 with the wall of the pipeline system. About a pivot axis denoted with 26, the lids 20 are each pivotably articulated on the main part 14 of the pneumatic tube conveyor capsule 10. The pivot axes 26 are aligned parallel or essentially parallel to the longitudinal axis 16 of the main part 14. According to an embodiment not shown in the drawing, the lids 20 can also be designed as hinged lids.

A magazine insert, overall denoted with 28, for receiving the sample tubes 12 is arranged within the tubular main part 14. The magazine insert 28 is arranged to be detachably held (not shown in detail) in the main part 14 of the pneumatic tube conveyor capsule. The magazine insert 28 comprises the longitudinal axis 30 which herein coincides with the longitudinal axis 16 of the pneumatic tube conveyor capsule 10.

The magazine insert 28 comprises a magazine drum 32 with an upper and a lower end plate 34a, 34b which are arranged at a distance from one another in axial direction. The two end plates 34a, 34b are each attached to a central tube 36. The magazine drum 32 is arranged to be held non-rotatably in the main part 14 of the pneumatic tube conveyor capsule 10.

A plurality of tubular receiving chambers 38 are used for receiving the sample tubes 12. The receiving chambers 38 each extend through the magazine drum 32 from the first opening arranged at the front of the magazine drum 32 in axial direction to the second opening 40 arranged at the front of the magazine drum 32.

The receiving chambers 38 are arranged at a distance from one another in an annular manner about the longitudinal axis 30 of the magazine insert 28. According to FIG. 1, the receiving chambers 38 are each delimited in circumferential direction by a sleeve-like wall element 42 and the two end plates 34a, 34b of the magazine insert 28. The sleeve-like wall elements 42 preferably consist of a plastic material. Advantageously, the plastic material is transparent for the spectral range of the light visible for humans. As a result, a proper positioning of the sample tubes 12 to be transported in the pneumatic tube conveyor capsule 10, and also unwanted leakages or contaminations of the receiving chambers 36 can be detected in a simple manner by an operator or by means of suitable sensors.

A fastening unit 44 is used to secure sample tubes 12 inserted in the receiving chambers 36. The fastening unit 44 comprises a bearing bushing 46 with one fastening element 48 for each receiving chamber 38, which protrudes outwardly from the bearing bushing 46 in radial direction. The bearing bushing 46, together with the fastening elements 48 arranged on said bearing bushing 46, are pivotable about the longitudinal axis 30 of the magazine insert 28 between a fastening position and a release position. According to FIG. 1, the fastening elements 46 can be designed to be bow-shaped and are preferably intrinsically elastically deformable or elastically articulated on the bearing bushing in circumferential direction.

A sliding member or slider 50 is used for adjusting the fastening unit 44. The slider 50 is arranged longitudinally slidably in axial direction in a central recess 52 of the magazine drum 32. For the purpose of a preferably low mass of the pneumatic tube conveyor capsule 10, the slider 50 is designed to be tubular and extends on one end beyond the lower end plate 34b of the magazine drum 32. The slider 50 is supported via a bearing element 54 on the bearing bushing in radial direction. Herein, the bearing element 54 is designed purely as an example in the form of an annular collar fastened to the slider 50. A spring element 56 preloaded in axial direction is supported on both ends by the bearing plate 54. The two spring elements 56 are synchronized such that the slider 50 is held in axial direction in its depicted neutral position or first functional position. The slider 50 can thus be deflected in axial direction against the force of one of the spring elements 56 from its depicted first functional position.

According to the perspective view of the magazine insert 28, the fastening unit 44 further comprises a closing means 58, by means of which the receiving chambers 38 are at least partially closable or transferable (in a synchronized manner) on one end in axial direction. Herein, the closing means 58 is designed in the form of a hole flange which extends away from the bearing bushing 46 in radial direction. The hole flange has recesses 60 which, in the release position of the fastening unit 44, are arranged to be aligned with the openings 40 of the lower end plate 34b in axial direction and allow for a passage of a sample tube 12 arranged in the corresponding receiving chamber 38 of the magazine drum 32. The closing means 58 can be particularly adhered or welded to the bearing bushing 46 or be integral with the bearing bushing 46 as an injection-molded part.

FIG. 2 shows a detached perspective view of the magazine insert 28 together with an actuation member 62 of a pneumatic tube conveyor system (not depicted) for the automatic unloading of the pneumatic tube conveyor capsule 12 (FIG. 1). The openings 40 of the receiving chambers 38 defined by the upper and lower end plate 34a, 34b can be clearly seen. The tubular wall element 42 of each receiving chamber 38 is each provided with a feedthrough recess 64 for the fastening element 44 respectively associated with the receiving chamber 38 (FIG. 1). The feedthrough recess 64 is designed such that the fastening element 48 is pivotable relative to the receiving chamber 38 about the longitudinal axis 30 of the magazine insert 28.

Figure 3:
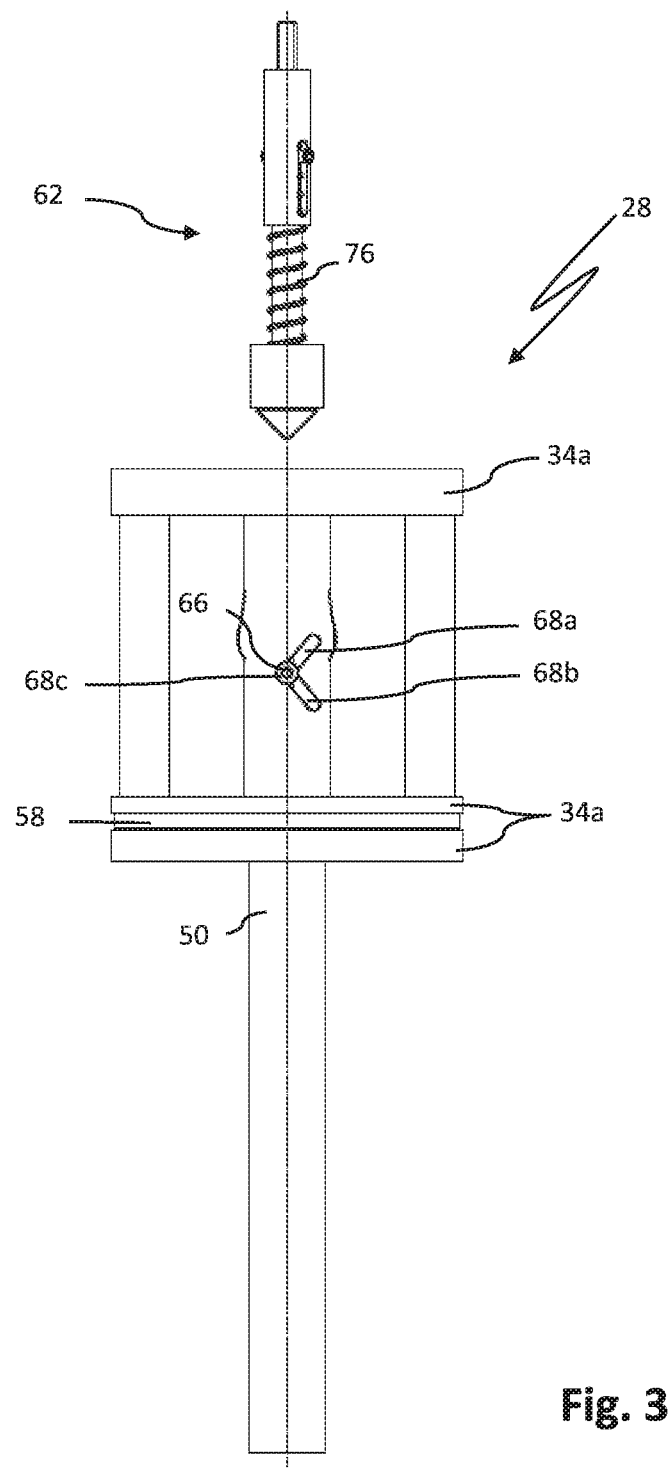
FIG. 3 is a side view of the magazine insert according to FIG. 1.

The slider 50 and the bearing bushing 46 of the fastening unit 44 are motion-coupled with one another via at least one catch element (=catch) 66. The catch element 66 is fastened to the slider 50 and extends from the slider 50 outwardly in radial direction. According to FIG. 2, the catch element 66 engages in a control cam 68 of the bearing bushing 46. Herein, the catch element 66 is designed exemplary as a screw which is screwed into the slider 50. According to the side view of the magazine insert 28 shown in FIG. 3, the control cam 68 is designed as a V-shaped elongated hole. The two limbs 68a, 68b of the elongated hole 68 extend away from their common base section 68c inversely in axial direction. If the catch element 66 is arranged in the area of the base 68c of the control cam, the fastening unit 44 is in its fastening position, in which it secures the sample tubes 12 in the corresponding receiving chamber 38. If the catch element 66 is arranged in the area of a free end of the respective limb 68a, 68b of the control cam 68, the fastening unit 44 is pivoted to its release position. The fastening unit 44 is thus pivotable from the fastening position to its release position by an axially oriented transfer of the slider 50 from its first functional position to its second functional position (=forward stroke end position).

According to FIG. 2, the hole flange is guided in axial direction between two end plate sections 70a, 70b of the lower end plate 34b of the magazine drum 32. The lower end plate 34b thus serves as a counter bearing for the fastening unit 44, and so the fastening unit 44 is arranged to be held axially immovably or essentially axially immovably relative to the magazine drum 32.

The actuation member 62 is movable in axial direction in order to unlock the fastening unit 44 of the magazine insert 28, i.e., to transfer it to its release position. The actuation member 62 can comprise a foot section 72 and a head section 74 which is used to contact and axially adjust the slider 50 of the magazine insert 28. The head section 74 can be arranged axially slidably relative to the foot section 72 against the force of a spring 76. As a result, position variances of the pneumatic tube conveyor capsule 10 within the respective pneumatic tube conveyor station or position variances of the slider 50 in axial direction relative to the main part 14 of the pneumatic tube conveyor capsule 10 (FIG. 1) can be reliably compensated.

Figure 4:
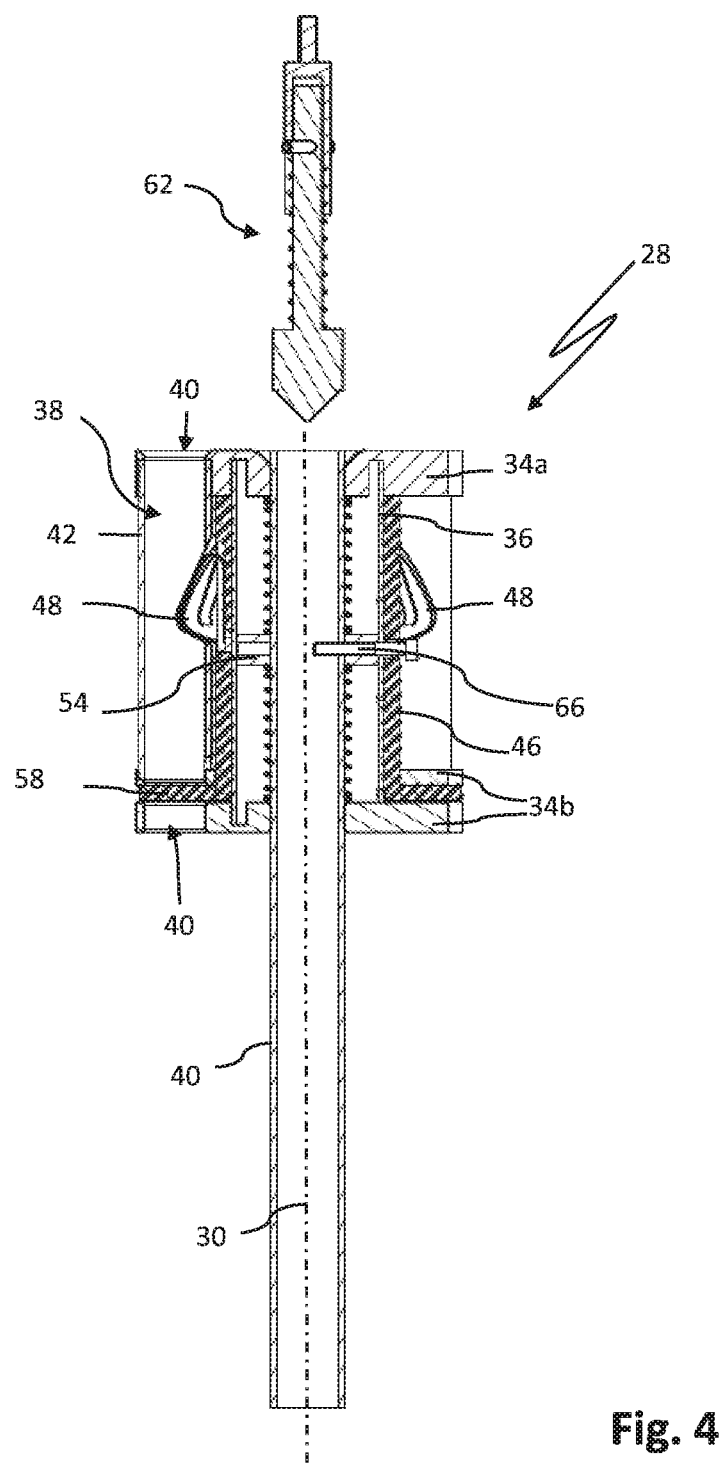
FIG. 4 is a detached cross-sectional view of the magazine insert according to FIG. 1.

According to the cross-sectional view of the magazine insert 28 shown in FIG. 4, the catch element 66 can extend through the bearing element 54 in order to achieve an anchoring of the catch element 66 on the slider 50 which is particularly stable under load. It is evident that the catch element 66 also extends through the central tube 36 of the magazine drum 32 in radial direction. For that purpose, the central tube 36 has a recess not depicted in the drawings.

Figure 5:
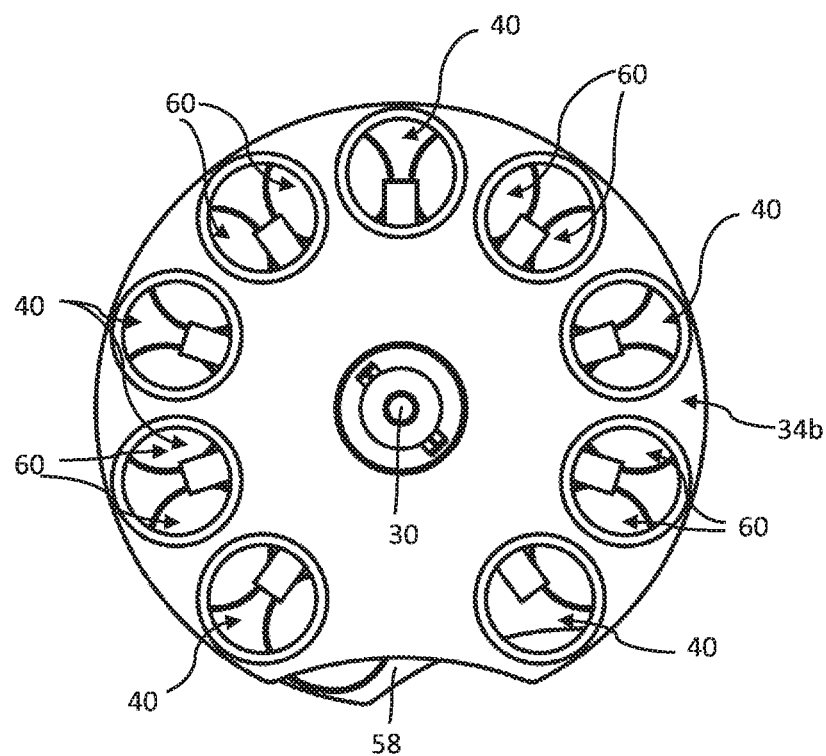
FIG. 5 is a front view of the magazine insert according to FIG. 1 with a fastening unit arranged in a fastening position.
Figure 6:
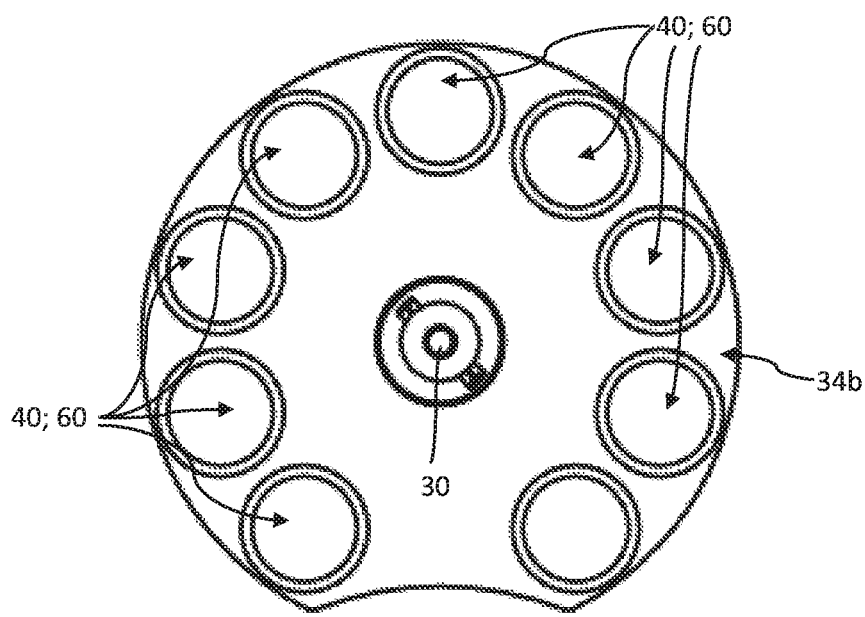
FIG. 6 is a front view of the magazine insert according to FIG. 1 with the fastening unit swiveled into the release position.

FIGS. 5 and 6 each show a front view of the lower end plate 34b of the magazine insert 28. The recesses 60 of the hole flange have a spatial distribution pattern that corresponds to the distribution pattern of the openings 40 of the lower end plate 34b. According to FIG. 5, the fastening unit 44 is arranged in its fastening position, in which the openings of the hole flange are arranged offset in swivel direction relative to the openings 40 of the lower end plate 34b. Therefore, the hole flange overlaps in sections each individual opening 40 of the lower end plate 34b in axial direction. A sample tube 12 to be arranged or arranged in the corresponding receiving chamber can thus not slide or be pushed inadvertently through the lower end plate 34b and out of the corresponding receiving chamber 38.

FIG. 6 shows the fastening unit 44 pivoted from the fastening position shown in FIG. 5 to its release position. The recesses 60 of the hole flange align in axial direction entirely with the openings 40 of the lower endplate 34b of the magazine drum 32, and so sample tubes arranged in the receiving chambers 38 can—following gravity—slide out of the magazine insert 28 and thus the pneumatic tube conveyor capsule 10 in axial direction.

For equipping the magazine insert 28 with sample tubes, they are inserted in the corresponding receiving chamber 38 of the magazine insert 28 via the openings 40 of the upper end plate 34a while the upper lid 20 of the pneumatic tube conveyor capsule 10 is open. The fastening elements 48 can be elastically deflected by the sample tube 12 in circumferential direction of the bearing bushing 46 in order to allow for the insertion of the respective sample tube 12. The sample tubes 12 can be pushed in axial direction until they bear against the closing means 58. For the transport of the sample tubes 12, they are arranged to be held in a clamped manner by the fastening elements 48 in their respective receiving chamber 38. Once the destination within the pneumatic tube conveyor system is reached, the fastening unit 44 can be unlocked, i.e., transferred to its release position, in a pneumatic tube conveyor station by means of a pressure punch 62 axially inserted in the pneumatic tube conveyor capsule from any side, and so sample tubes follow gravity and are guided out of the pneumatic tube conveyor capsule 12. When the pressure punch 62 is pulled back, a spring force is applied and the fastening device is once again transferred back to its fastening position. The pneumatic tube conveyor capsule 10 is thus available to once again be equipped with sample tubes 12 to be transported.

What is claimed is:

1. A magazine insert for a pneumatic tube conveyor capsule, for receiving sample tubes filled with bodily fluids, the magazine insert comprising:
   a magazine drum having a plurality of receiving chambers for the sample tubes which are arranged annularly about the longitudinal axis of the magazine insert, and each extends through the magazine drum in a direction axial to the longitudinal axis;
   a fastening unit which is pivotable about the longitudinal axis from a fastening position to a release position, wherein a sample tube arranged in the respective receiving chamber is held solely in a fixed position relative to the magazine drum by means of the fastening unit arranged in the fastening position;
   a slider which is arranged in the central recess of the magazine drum, and which is slidable in axial direction from a first functional position bidirectionally to a respective second functional position relative to the magazine drum; and
   a catch element which is fastened to the slider and extends in radial direction into a control cam of the fastening unit, and so a pivoting of the fastening unit from the fastening position to its release position can be effected by transferring the slider to its corresponding second functional position.

2. The magazine insert according to claim 1, wherein the slider is designed to be tubular or rod-shaped.

3. The magazine insert according to claim 2, wherein the fastening unit comprises a bearing bushing with one fastening element for each receiving chamber, which protrudes from the bearing bushing in radial direction.

4. The magazine insert according to claim 1, wherein the fastening unit comprises a bearing bushing with one fastening element for each receiving chamber, which protrudes from the bearing bushing in radial direction.

5. The magazine insert according to claim 4, wherein the bearing bushing is provided with the control cam.

6. The magazine insert according to claim 5, wherein the control cam is designed as a V-shaped, elongated hole.

7. The magazine insert according to claim 3, wherein the fastening unit comprises at least one closing means, by means of which the receiving chambers are at least partially closable or transferable, in a synchronized manner, on one end.

8. The magazine insert according to claim 7, wherein the closing means is designed in the form of a hole flange which extends away from the bearing bushing in radial direction.

9. The magazine insert according to claim 8, wherein the magazine insert comprises a first and a second end plate which are connected to one another via a central tube, wherein the receiving chambers are delimited at their circumference by the two end plates and by one respective tubular wall element arranged to be held between the two end plates.

10. The magazine insert according to claim 9, wherein the slider is guided in sections on the central tube, via an annular collar, in a form closure with sliding clearance.

11. The magazine insert according to claim 10, wherein the hole flange is guided in axial direction on one of the two end plates of the magazine drum, between two end plate sections of one of the two end plates.

12. The magazine insert according to claim 9, wherein the hole flange is guided in axial direction on one of the two end plates of the magazine drum, between two end plate sections of one of the two end plates.

13. The magazine insert according to claim 9, wherein the wall elements are each transparent for the spectral range of the light visible for humans.

14. The magazine insert according to claim 1, wherein slider protrudes on one end from the magazine drum.

15. The pneumatic tube conveyor capsule having a tubular main part which on both ends has an opening closable with a lid, wherein the magazine insert according to claim 1 is arranged in the tubular main part, wherein the magazine drum of the magazine insert is arranged to be held non-rotatably in the tubular main part.

\* \* \* \* \*